United States Patent
Aoyama et al.

(10) Patent No.: US 12,377,697 B2
(45) Date of Patent: Aug. 5, 2025

(54) ELECTROMAGNETIC SUSPENSION

(71) Applicant: Hitachi Astemo, Ltd., Hitachinaka (JP)

(72) Inventors: Yasuaki Aoyama, Tokyo (JP); Ryosuke Hoshi, Tokyo (JP); Nobuyuki Ichimaru, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 408 days.

(21) Appl. No.: 17/928,878

(22) PCT Filed: Apr. 16, 2021

(86) PCT No.: PCT/JP2021/015650
§ 371 (c)(1),
(2) Date: Nov. 30, 2022

(87) PCT Pub. No.: WO2021/261059
PCT Pub. Date: Dec. 30, 2021

(65) Prior Publication Data
US 2023/0226868 A1 Jul. 20, 2023

(30) Foreign Application Priority Data
Jun. 24, 2020 (JP) .................................. 2020-108633

(51) Int. Cl.
*B60G 17/015* (2006.01)
*B60G 15/04* (2006.01)
(Continued)

(52) U.S. Cl.
CPC ......... *B60G 15/04* (2013.01); *B60G 17/0157* (2013.01); *B60G 17/06* (2013.01);
(Continued)

(58) Field of Classification Search
CPC .... B60G 15/04; B60G 17/0157; B60G 17/06; B60G 2202/25; B60G 2202/422;
(Continued)

(56) References Cited

U.S. PATENT DOCUMENTS 8,776,962 B2 * 7/2014 Lee ...................... H02K 41/031
188/322.22
9,835,222 B2 * 12/2017 Berg ....................... F16H 25/24
(Continued)

FOREIGN PATENT DOCUMENTS

JP  2002-295580 A  10/2002
JP  2007-274820 A  10/2007
(Continued)

OTHER PUBLICATIONS

English Translation of International Search Report issued in corresponding International Application No. PCT/JP2021/015650, dated Jun. 22, 2021.

*Primary Examiner* — Thomas W Irvin
(74) *Attorney, Agent, or Firm* — Foley & Lardner LLP

(57) ABSTRACT

The present invention provides an electromagnetic suspension capable of suppressing interference with other components and devices, being mounted in a narrow space, and having a small thrust pulsation, a large thrust, and a high damping performance even for a high-frequency vibration source. An electromagnetic suspension of the present invention includes a linear motor that includes an armature and a permanent magnet portion, the armature including a winding and a magnetic body, the permanent magnet portion being disposed on an outer periphery of the armature and including a permanent magnet and a cylindrical magnetic body, and the armature and the permanent magnet portion being relatively linearly driven in the linear motor, in which a recess recessed from an outer peripheral portion of the cylindrical magnetic body and a protrusion protruding from the outer peripheral portion are disposed on the same circumference of the outer peripheral portion of the cylindrical magnetic body.

9 Claims, 13 Drawing Sheets

(51) Int. Cl.
  *B60G 17/06*  (2006.01)
  *F16F 15/03*  (2006.01)
  *H02K 41/03*  (2006.01)

(52) U.S. Cl.
  CPC ....... *H02K 41/031* (2013.01); *B60G 2202/25* (2013.01); *B60G 2202/422* (2013.01); *B60G 2204/62* (2013.01); *B60G 2206/41* (2013.01); *B60G 2500/104* (2013.01); *B60G 2600/24* (2013.01); *B60G 2800/162* (2013.01)

(58) Field of Classification Search
  CPC ............ B60G 2204/62; B60G 2206/41; B60G 2500/104; B60G 2600/24; B60G 2800/162; F16F 15/03; H02K 41/031
  See application file for complete search history.

(56) References Cited

U.S. PATENT DOCUMENTS

| | | | | |
|---|---|---|---|---|
| 10,690,215 B2 * | 6/2020 | Sakka | ................... | B60G 13/14 |
| 11,270,826 B2 * | 3/2022 | Yamazaki | ................. | H01F 7/16 |
| 11,485,188 B2 * | 11/2022 | Yamazaki | ........ | B60G 17/01941 |
| 11,926,185 B2 * | 3/2024 | Yamazaki | ............ | B60G 17/017 |
| 2003/0034697 A1 * | 2/2003 | Goldner | .................. | F16F 15/03 310/15 |
| 2012/0217105 A1 * | 8/2012 | Lee | ....... | H02K 41/031 188/267 |
| 2013/0025986 A1 * | 1/2013 | Lee | ......... | B60G 11/00 188/267 |
| 2014/0238793 A1 * | 8/2014 | Nanbara | ................ | F16F 15/03 188/267 |
| 2015/0061244 A1 * | 3/2015 | Klein | ................... | B60G 15/062 280/5.515 |
| 2015/0231942 A1 * | 8/2015 | Trangbaek | ............ | F16F 15/022 267/195 |
| 2018/0250998 A1 | 9/2018 | Sigmar | | |
| 2021/0101435 A1 * | 4/2021 | Yamazaki | ........ | B60G 17/01941 |
| 2021/0101436 A1 * | 4/2021 | Yamazaki | .......... | B60G 17/0157 |
| 2021/0252931 A1 * | 8/2021 | Yamazaki | ........... | B60G 17/017 |

FOREIGN PATENT DOCUMENTS

| | | |
|---|---|---|
| JP | 2013-029159 A | 2/2013 |
| JP | 2014-167320 A | 9/2014 |

* cited by examiner

ELECTROMAGNETIC SUSPENSION

TECHNICAL FIELD

The present invention relates to an electromagnetic suspension including a linear motor.

BACKGROUND ART

An electromagnetic suspension including a linear motor generally includes a cylindrical permanent magnet portion on an inner periphery of which a permanent magnet is disposed, and an armature movably inserted into the permanent magnet portion.

JP 2013-29159 A (hereinafter, referred to as PTL 1) is disclosed as a background art of this technical field. PTL 1 describes an electromagnetic suspension including a linear motor in which a coil is disposed on an outer periphery of a stator and a permanent magnet is disposed on an inner periphery of an armature (see ABSTRACT).

CITATION LIST

Patent Literature

PTL 1: JP 2013-29159 A

SUMMARY OF INVENTION

Technical Problem

An electromagnetic suspension including a linear motor can generate a damping force without a deceleration mechanism such as a lever and a gear disposed in a conventional hydraulic suspension, has high responsiveness, and has an improved damping performance even for a high-frequency vibration source.

On the other hand, in the electromagnetic suspension, since the linear motor directly generates damping force and is without the deceleration mechanism, the size of the linear motor is large. Therefore, the electromagnetic suspension has a problem that a size and a diameter of the electromagnetic suspension are larger than those of the conventional hydraulic suspension.

Specifically, when a conventional hydraulic suspension is replaced with an electromagnetic suspension in order to improve a damping performance of an engine-driven automobile, there is a problem that a size and a diameter of the electromagnetic suspension increase and the electromagnetic suspension interferes with (comes into contact with) other components and devices.

Furthermore, in recent years, electric vehicles such as an HEV and an EV have increased due to the requirement of $CO_2$ reduction. Since the electric vehicle is equipped with a small engine or has no engine itself, the engine room is also downsized, and the space for mounting the electromagnetic suspension is also reduced.

In the case of an electric vehicle, it is necessary to mount an electromagnetic suspension in a smaller space than in the case of an automobile, and there is a problem that the electromagnetic suspension interferes with other components and devices.

PTL 1 describes an electromagnetic suspension including a linear motor. However, PTL 1 does not resolve a problem that when an electromagnetic suspension is mounted on an automobile or an electric vehicle, the electromagnetic suspension interferes with other components or devices due to the size and diameter of the electromagnetic suspension.

Therefore, the present invention provides an electromagnetic suspension that can be mounted in a narrow space (small space) by suppressing (avoiding) interference with other components and devices, and has a small thrust pulsation, a large thrust, and a high damping performance even for a high-frequency vibration source.

Solution to Problem

In order to solve the above problem, an electromagnetic suspension of the present invention includes a linear motor that includes an armature and a permanent magnet portion, the armature including a winding and a magnetic body, the permanent magnet portion being disposed on an outer periphery of the armature and including a permanent magnet and a cylindrical magnetic body, and the armature and the permanent magnet portion being relatively linearly driven in the linear motor, in which a recess recessed from an outer peripheral portion of the cylindrical magnetic body and a protrusion protruding from the outer peripheral portion are disposed on the same circumference of the outer peripheral portion of the cylindrical magnetic body.

Advantageous Effects of Invention

According to the present invention, it is possible to provide an electromagnetic suspension that can be mounted in a narrow space (small space) by suppressing (avoiding) interference with other components and devices and has a small thrust pulsation, a large thrust, and a high damping performance even for a high-frequency vibration source.

Features, configurations, and effects other than those described above will be clarified by the following description of embodiments.

DESCRIPTION OF EMBODIMENTS

Figure 1:
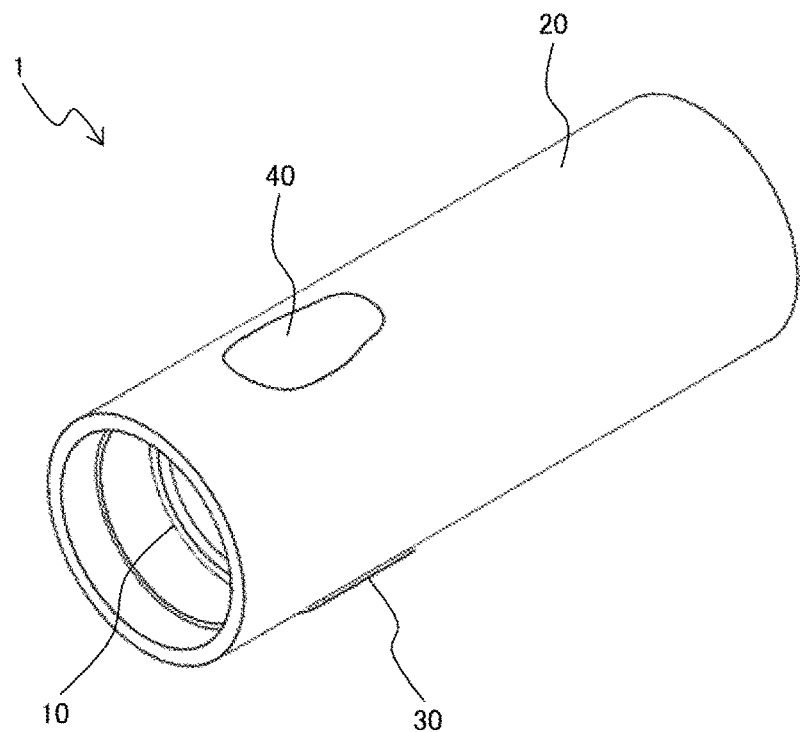
FIG. 1 is an explanatory diagram for explaining a linear motor 1 according to the first embodiment in a perspective manner.

Hereinafter, embodiments of the present invention will be described with reference to the drawings. Note that substantially the same or similar configurations are denoted by the same reference numerals, and in a case where descriptions thereof overlap, the description thereof may be omitted.

First Embodiment

First, a linear motor 1 according to the first embodiment will be described in a perspective manner.

FIG. 1 is an explanatory diagram for explaining a linear motor 1 according to the first embodiment in a perspective manner.

The linear motor 1 according to the first embodiment includes a cylindrical permanent magnet portion 20 on an inner periphery of which a permanent magnet is disposed, and an armature 10 movably inserted into the permanent magnet portion 20.

Note that the linear motor 1 illustrated in FIG. 1 is extracted from the electromagnetic suspension, and illustrates main components of the linear motor 1, and does not illustrate a spring portion (spring, spring holding member, and the like), a link portion (connection rod and the like), and the like included in the electromagnetic suspension.

Further, the linear motor 1 has a recess 40 and a protrusion 30 on the surface of the permanent magnet portion 20.

Next, the linear motor 1 according to the first embodiment will be described taken along a YZ plane.

Figure 2:
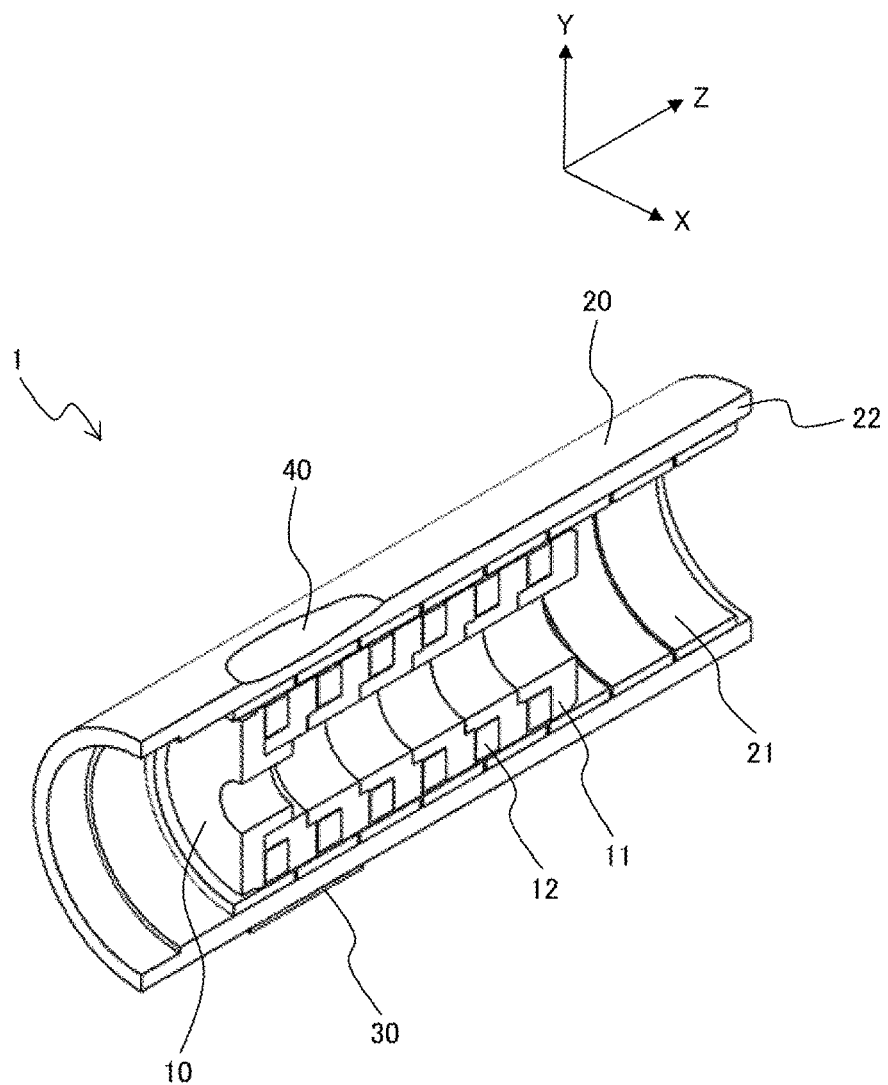
FIG. 2 is an explanatory diagram for explaining the linear motor 1 according to the first embodiment taken along a YZ plane.

FIG. 2 is an explanatory diagram for explaining the linear motor 1 according to the first embodiment taken along a YZ plane.

The linear motor 1 includes the permanent magnet portion 20 including a plurality of permanent magnets 21 disposed in the Z direction and a cylindrical magnetic body (a cylinder of an outer peripheral portion of the linear motor 1: an outer cylinder) 22 disposed on an outer periphery thereof, and the armature 10 including a magnetic body 11 including teeth and a plurality of windings (coils) 12 disposed in the Z direction, where the armature 10 is disposed so as to face an inner periphery of the permanent magnet 21.

That is, the linear motor 1 includes the armature 10 on the outer periphery of which the winding 12 is disposed, and the permanent magnet portion 20 on the inner periphery of which the permanent magnet 21 is disposed. The linear motor 1 includes the armature 10 in which the winding 12 is disposed between magnetic bodies 11, and the permanent magnet portion 20 in which the magnetic body 22 is disposed on the outer periphery of the permanent magnet 21. The permanent magnet portion 20 is disposed on the outer periphery of the armature 10.

Then, in the linear motor 1, the permanent magnet portion 20 and the armature 10 relatively move (linearly drive) in the Z direction, and generate a force in the Z direction, that is, thrust.

Furthermore, the linear motor 1 has the recess 40 and the protrusion 30 on the surface of the permanent magnet portion 20, that is, on the magnetic body 22.

In the first embodiment, the linear motor 1 has a "5-pole 6-slot structure" in which the magnetic body 11 including six teeth are disposed for the five permanent magnets 21. This structure is an example of the linear motor 1, and is not limited to this structure as long as a similar effect can be obtained.

In the first embodiment, the linear motor 1 is a three-phase motor that applies a three-phase alternating current to the six windings 12, and can generate an any thrust at an any position by changing a current value applied to the six windings 12. This thrust is generated by the interaction between the magnetic flux generated by the permanent magnets 21 and the magnetic flux generated by the windings 12.

Here, in a case where the linear motor 1 is disposed in a narrow space in which other components and devices are disposed, there is a possibility that the linear motor 1 interferes with other components and devices, and it is necessary to scrape off the magnetic body 22 at the interfering portion. The scraped portion is a recess 40 recessed from the outer peripheral portion of the cylindrical magnetic body 22.

In the linear motor 1, the amount of magnetic flux is determined in consideration of necessary thrust and maximum thrust, and a magnetic circuit (magnetic flux path of the magnet) corresponding to the amount of magnetic flux is configured. Since the magnetic body 22 constitutes this magnetic circuit, when the recess 40 is formed in the magnetic body 22, a phenomenon in which the thrust pulsation increases and the thrust decreases occurs. Therefore, the protrusion 30 made of a magnetic material and bulging (protruding) from the outer peripheral portion of the cylindrical magnetic body 22 is disposed on the magnetic body 22 to suppress the thrust pulsation and improve the thrust.

In the first embodiment, the protrusion 30 is a tape-shaped magnetic body attached to the magnetic body 22. However, the present invention is not limited to this structure as long as the same effect can be obtained. The protrusion 30 may be configured integrally with the magnetic body 22 or may be configured separately from the magnetic body 22. The recess 40 is formed integrally with magnetic body 22.

When a tape-shaped magnetic body is used for the protrusion 30, an adhesive or the like may be interposed between the protrusion 30 and the magnetic body 22. In this case, it is assumed that the magnetic resistance increases due to a gap generated by an adhesive or the like. In this case, the thickness of the protrusion 30 is increased, the width of the protrusion 30 is increased, or a material having a small magnetic resistance is used.

When forming the protrusion 30 and the magnetic body 22 separately, the magnetic performance can be adjusted, for example, by using a tape-shaped magnetic body for the protrusion 30.

As described above, in the linear motor 1, by disposing the recess 40 and the protrusion 30 on the surface of the permanent magnet portion 20, that is, on the magnetic body 22, it is possible to suppress the thrust pulsation, improve the thrust, suppress interference with other components and devices, and mount the linear motor 1 in a narrow space.

Next, the relationship between the relative position between the permanent magnet portion 20 and the armature 10 of the linear motor 1 according to the first embodiment and the thrust will be described.

Figure 3:
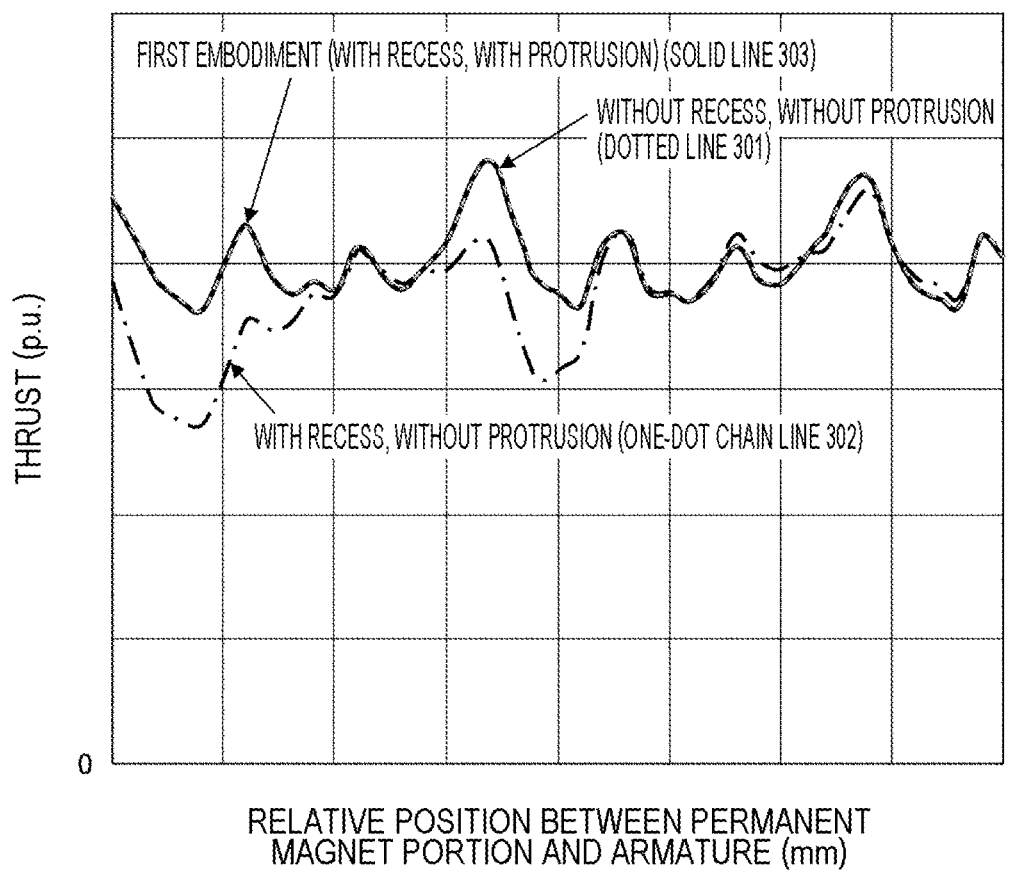
FIG. 3 is an explanatory diagram for explaining a relationship between a relative position between a permanent magnet portion 20 and an armature 10 of a linear motor 1 according to the first embodiment and a thrust.

FIG. 3 is an explanatory diagram for explaining the relationship between the relative position between the permanent magnet portion 20 and the armature 10 of the linear motor 1 according to the first embodiment and the thrust.

FIG. 3 illustrates the thrust characteristics (the relationship between the relative position between the permanent magnet portion 20 and the armature 10 and the thrust) (1) in a case where no recess 40 and no protrusion 30 are disposed in the magnetic body 22 (dotted line 301), (2) in a case where the recess 40 is formed in the magnetic body 22 (the protrusion 30 is not disposed) (one-dot chain line 302), and (3) in a case where the recess 40 and the protrusion 30 are disposed in the magnetic body 22 (solid line 303).

In a case where no recess 40 and no protrusion 30 are disposed in the magnetic body 22, a magnetic circuit corresponding to the amount of magnetic flux determined in consideration of the necessary thrust or the maximum thrust is configured, generating a normal thrust pulsation and a normal thrust. The thrust characteristics at this time are as indicated by the dotted line 301 in FIG. 3.

When the recess 40 is formed in the magnetic body 22 (the protrusion 30 is not disposed), saturation of magnetic flux occurs due to the recess 40, an imbalance of magnetic flux generated by a three-phase alternating current occurs, the thrust pulsation increases, and the thrust decreases. The thrust characteristic at this time is as indicated by the one-dot chain line 302 in FIG. 3.

In order to eliminate the phenomenon that the thrust pulsation increases and the thrust decreases, that is, in order to suppress the thrust pulsation and improve the thrust, the protrusion 30 is disposed on the magnetic body 22.

In a case where the recess 40 and the protrusion 30 are disposed in the magnetic body 22, the protrusion 30 suppresses an increase in the magnetic resistance of the magnetic circuit reduced by the recess 40, suppresses the thrust pulsation, and improves the thrust. Then, the thrust characteristics at this time are as indicated by the solid line 303 in FIG. 3 and are similar to the dotted line 301 in FIG. 3. That is, this configuration generates a normal pulsation thrust and a normal thrust.

By disposing the recess 40 and the protrusion 30 on the surface of the magnetic body 22 in this manner, it is possible to eliminate a phenomenon that the thrust pulsation increases and the thrust decreases, suppress interference with other components and devices, and mount the linear motor 1 in a narrow space.

The recess 40 and the protrusion 30 are preferably disposed on the same circumference of the magnetic body 22. That is, the protrusion 30 is preferably disposed on the magnetic body 22 on the same circumference on which the recess 40 is formed. In addition, it is preferable that the volume of the protrusion 30 and the volume of the recess 40 are the same, or the volume of the protrusion 30 is larger than the volume of the recess 40.

This is because the protrusion 30 suppresses an increase in the magnetic resistance of the magnetic circuit reduced by the recess 40. As a result, the protrusion 30 suppresses the thrust pulsation and improves the thrust. Next, an electromagnetic suspension 2 according to the first embodiment will be described in a perspective manner.

Figure 4:
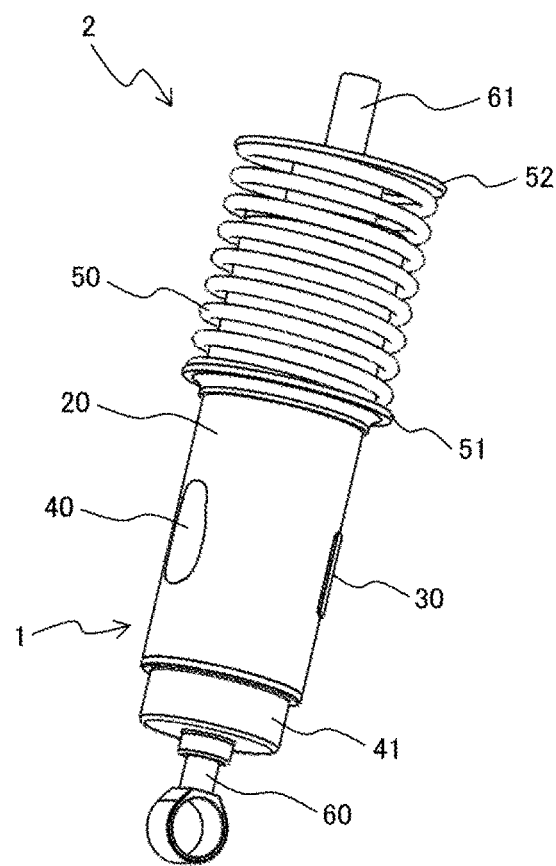
FIG. 4 is an explanatory diagram for explaining an electromagnetic suspension 2 according to the first embodiment in a perspective manner.

FIG. 4 is an explanatory diagram for explaining the electromagnetic suspension 2 according to the first embodiment in a perspective manner.

The electromagnetic suspension 2 according to first embodiment includes the linear motor 1, a cylindrical end cover 41, a spring 50, a lower spring holding member 51, an upper spring holding member 52, a spring lower connection rod 60, and a vehicle connection rod 61.

The cylindrical end cover 41 is disposed at one end of linear motor 1 (permanent magnet portion 20). The spring lower connection rod 60 is coupled to the cylindrical end cover 41. Components such as a tire (wheel) (not illustrated), a lower arm (not illustrated), and a brake (not illustrated) disposed in the vehicle are coupled to the distal end of the spring lower connection rod 60.

The vehicle connection rod 61 is disposed at the other end of the linear motor 1 (permanent magnet portion 20). A component such as an upper mount (not illustrated) disposed in the vehicle is coupled to the distal end of the vehicle connection rod 61.

The lower spring holding member 51 is disposed on an outer periphery of the linear motor 1 (permanent magnet portion 20) and in a middle of the linear motor 1 (permanent magnet portion 20). The upper spring holding member 52 is disposed at the vehicle connection rod 61. The spring 50 is disposed on the outer periphery of the linear motor 1 (permanent magnet portion 20) so as to be sandwiched between the upper spring holding member 52 and the lower spring holding member 51.

The recess 40 and the protrusion 30 are provided on the surface of the linear motor 1 (permanent magnet portion 20) in the region where the spring 50 is not disposed and on the outer periphery of the linear motor 1 (permanent magnet portion 20), that is, the surface of the magnetic body 22 on the same circumference.

In the linear motor 1, the permanent magnet portion 20 is disposed on the outer periphery of the armature 10, and the permanent magnet 21 of the permanent magnet portion 20 faces the magnetic body 11 and the winding 12 of the armature 10, whereby the area in which the permanent magnet 21, and the magnetic body 11 and the winding 12 face can be increased. With such a linear motor 1, it is possible to realize the electromagnetic suspension 2 having a large thrust.

Next, the YZ cross section of the electromagnetic suspension 2 according to the first embodiment will be described.

Figure 5:
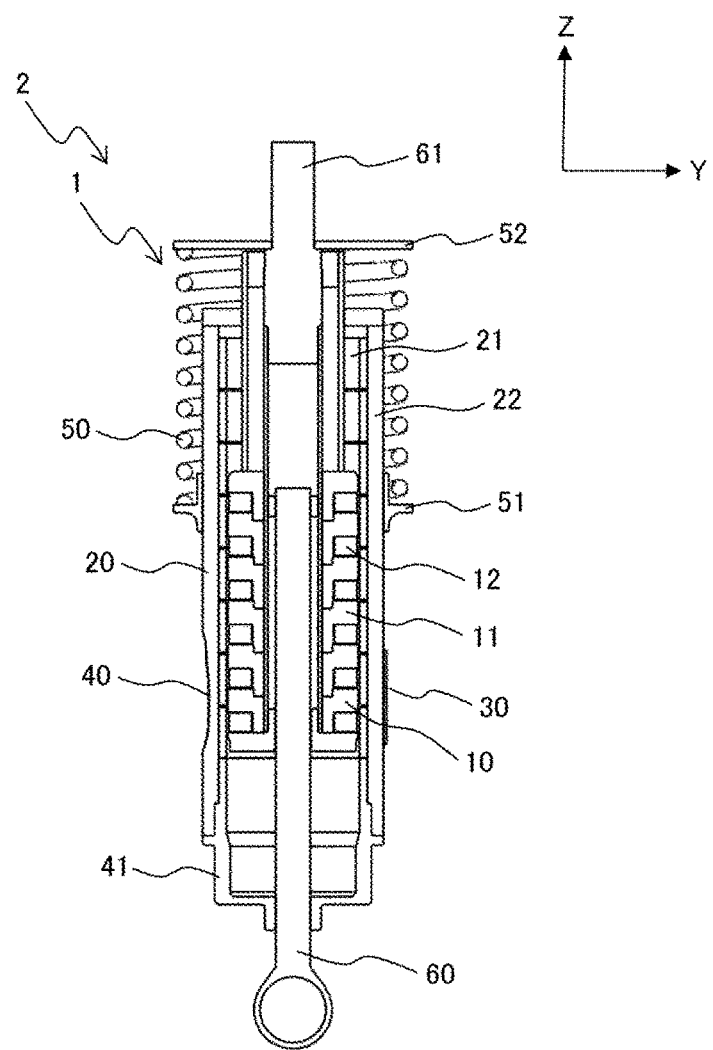
FIG. 5 is an explanatory diagram for explaining a YZ cross section of the electromagnetic suspension 2 according to the first embodiment.

FIG. 5 is an explanatory diagram for explaining the YZ cross section of the electromagnetic suspension 2 according to the first embodiment.

The electromagnetic suspension 2 includes the armature 10 including the magnetic body 11 and the winding 12, and the permanent magnet portion 20 including the permanent magnet 21 and the magnetic body 22. The vehicle connection rod 61 is coupled to the armature 10, and the spring lower connection rod 60 is coupled to the permanent magnet portion 20 via the cylindrical end cover 41.

As a result, the electromagnetic suspension 2 relatively displaces the spring lower side and the vehicle side, and controls the vibration of the vehicle by the spring 50 and the linear motor 1 disposed between the spring lower side and the vehicle side.

Then, the recess 40 and the protrusion 30 are disposed on the surface of the linear motor 1 in consideration of positions of the components and devices that interfere with the electromagnetic suspension 2. Thus, the electromagnetic suspension 2 does not interfere with other components and devices.

Next, a vehicle 80 equipped with the electromagnetic suspension 2 according to the first embodiment will be described.

Figure 6:
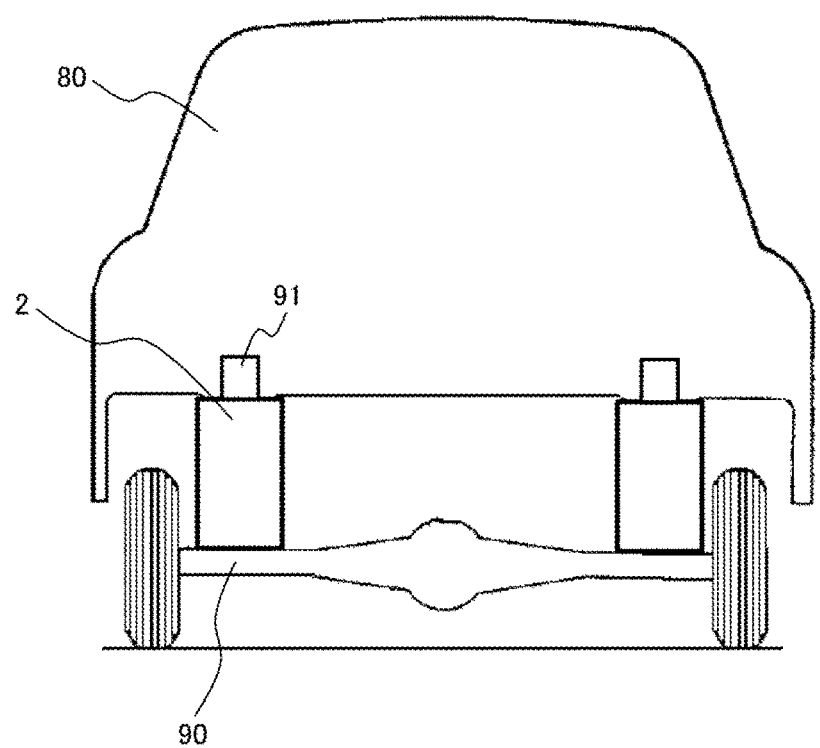
FIG. 6 is an explanatory diagram for explaining a vehicle 80 equipped with the electromagnetic suspension 2 according to the first embodiment.

FIG. 6 is an explanatory diagram for explaining the vehicle 80 equipped with the electromagnetic suspension 2 according to the first embodiment.

The vehicle (automobile, electric vehicle, and vehicle body) 80 according to the first embodiment includes the electromagnetic suspension 2, a spring lower member 90, and a vehicle member 91.

The electromagnetic suspension 2 is coupled to the spring lower member 90 and the vehicle member 91.

Components and devices that interfere with the electromagnetic suspension 2 are disposed on either the spring lower member 90 side or the vehicle member 91 side. There are also components and devices that couple the spring lower member 90 and the vehicle member 91, such as a knuckle (not illustrated).

The recess 40 and the protrusion 30 are disposed on the surface of the linear motor 1 in consideration of the positions of components and devices that interfere with the electromagnetic suspension 2. Thus, the electromagnetic suspension 2 does not interfere with other components and devices.

The recess 40 and the protrusion 30 are disposed on the same circumference of the outer periphery of the linear motor 1 and on the surface of the linear motor 1 in the region where the spring 50 is not disposed, so that the electromagnetic suspension 2 can suppress interference with other components and devices.

Next, the YZ cross section of the magnetic body 22 according to the first embodiment will be described.

Figure 7:
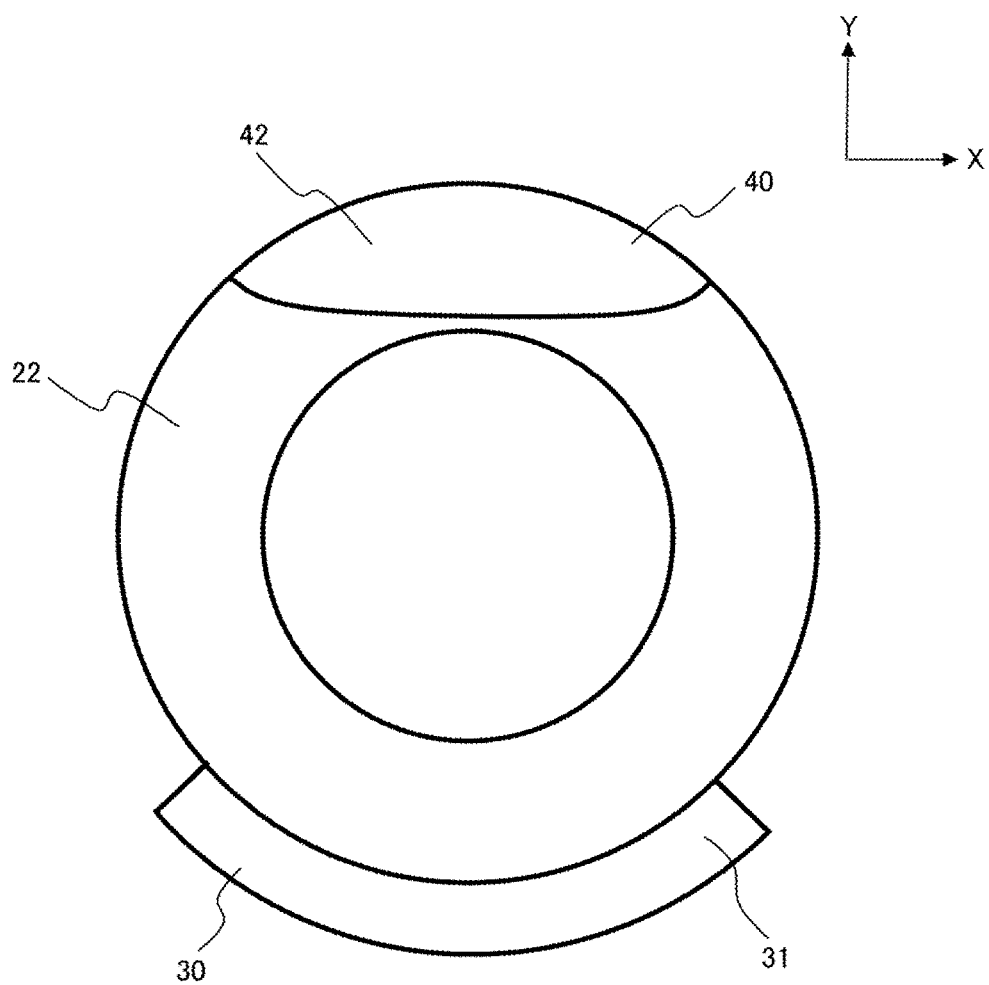
FIG. 7 is an explanatory diagram for explaining a YZ cross section of a magnetic body 22 according to the first embodiment.

FIG. 7 is an explanatory diagram for explaining the YZ cross section of the magnetic body 22 according to the first embodiment.

The magnetic body 22 according to the first embodiment has the recess 40 and the protrusion 30.

By disposing the recess 40 in the magnetic body 22, the magnetic path cross-sectional area of a recess cross section 42 decreases, and the magnetic resistance of the magnetic circuit increases. On the other hand, by disposing the protrusion 30 on the magnetic body 22, the magnetic path cross-sectional area of a protrusion cross section 31 increases, and an increase in the magnetic resistance of the magnetic circuit is suppressed.

Here, it is assumed that the width (length in the Z direction) of the recess 40 and the width (length in the Z direction) of the protrusion 30 are the same.

The cross-sectional area of the protrusion 30 (the cross-sectional area of the protrusion cross section 31) is equal to or larger than the cross-sectional area of the recess 40 (the cross-sectional area of the recess cross section 42). That is, "the cross-sectional area of the protrusion cross section 31 the cross-sectional area of the recess cross section 42".

Here, the cross-sectional area of the protrusion 30 (cross-sectional area of the protrusion cross section 31) is a cross-sectional area of a portion bulging (protruding) from the outer peripheral portion of the cylindrical magnetic body 22, and the cross-sectional area of the recess 40 (cross-sectional area of the recess cross section 42) is a cross-sectional area of a portion recessed from the outer peripheral portion of the cylindrical magnetic body 22.

In addition, in the case where the magnetic permeability of the material of the protrusion 30 is higher than the magnetic permeability of the material of the magnetic body 22, the cross-sectional area of the protrusion cross section 31 can be reduced as compared with the case where the magnetic permeability of the material of the protrusion 30 is the same as the magnetic permeability of the material of the magnetic body 22.

As described above, when the material of the protrusion 30 has a higher magnetic permeability than the material of the magnetic body 22, the cross-sectional area of the protrusion cross section 31 can be reduced, and the protruding portion of the protrusion 30 can be minimized. In addition, when the material of the protrusion 30 has a smaller magnetic resistance than the material of the magnetic body 22, the cross-sectional area of the protrusion cross section 31 can be reduced, and the protruding portion of the protrusion 30 can be minimized.

That is, a magnetic flux equivalent to a magnetic flux (the magnetic flux that should have flowed through the recess cross section 42) reduced by the recess 40 formed in the magnetic body 22 may be flowed through the protrusion cross section 31 of the protrusion 30 on the magnetic body 22.

As described above, the electromagnetic suspension 2 according to the first embodiment includes the linear motor 1 that includes the armature 10 including the winding 12 and the magnetic body 11 and the permanent magnet portion 20 disposed on the outer periphery of the armature 10 and including the permanent magnet 21 and the cylindrical magnetic body 22, in which the armature 10 and the permanent magnet portion 20 are relatively linearly driven in the linear motor 1.

On the same circumference of the outer peripheral portion of cylindrical magnetic body 22, the recess 40 recessed from the outer peripheral portion and the protrusion 30 bulging (protruding) from the outer peripheral portion are disposed.

According to the first embodiment, it is possible to provide a highly responsive linear motor-type in-vehicle electromagnetic suspension 2 that can be mounted in a narrow space while suppressing interference with other components and devices. Then, according to the first embodiment, it is possible to provide the in-vehicle electromagnetic suspension 2 that includes (mounts) the linear motor 1 having a small thrust pulsation, a large thrust, and a high damping performance even for a high-frequency vibration source.

In the first embodiment, the in-vehicle electromagnetic suspension 2 is described, but the electromagnetic suspension 2 according to the first embodiment can also be used for a damping device of another product other than a vehicle.

Second Embodiment

Next, a description will be given of the linear motor 1 according to the second embodiment in a perspective manner and the linear motor 1 according to the second embodiment taken along a YZ plane.

Figure 8:
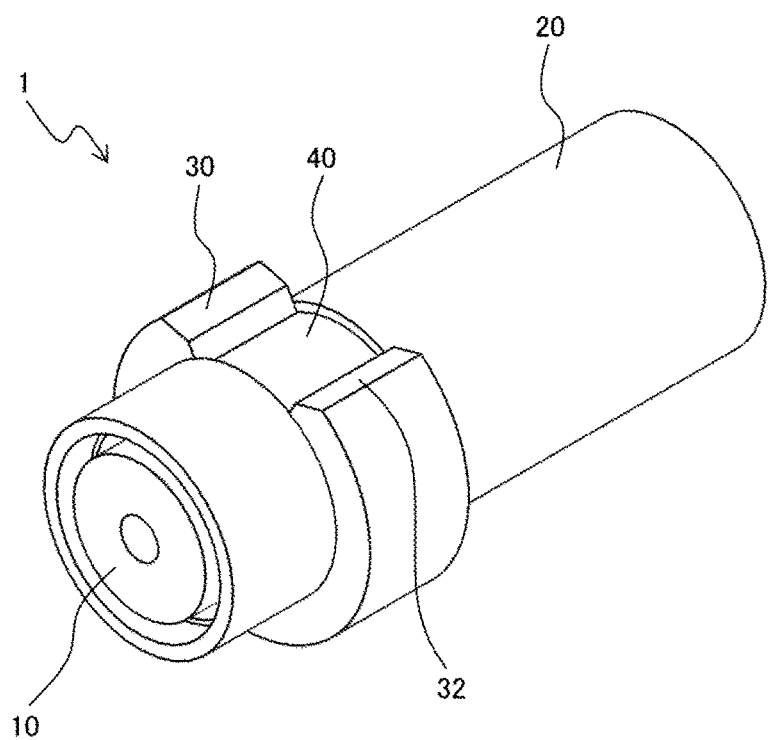
FIG. 8 is an explanatory diagram for explaining a linear motor 1 according to the second embodiment in a perspective manner.
Figure 9:
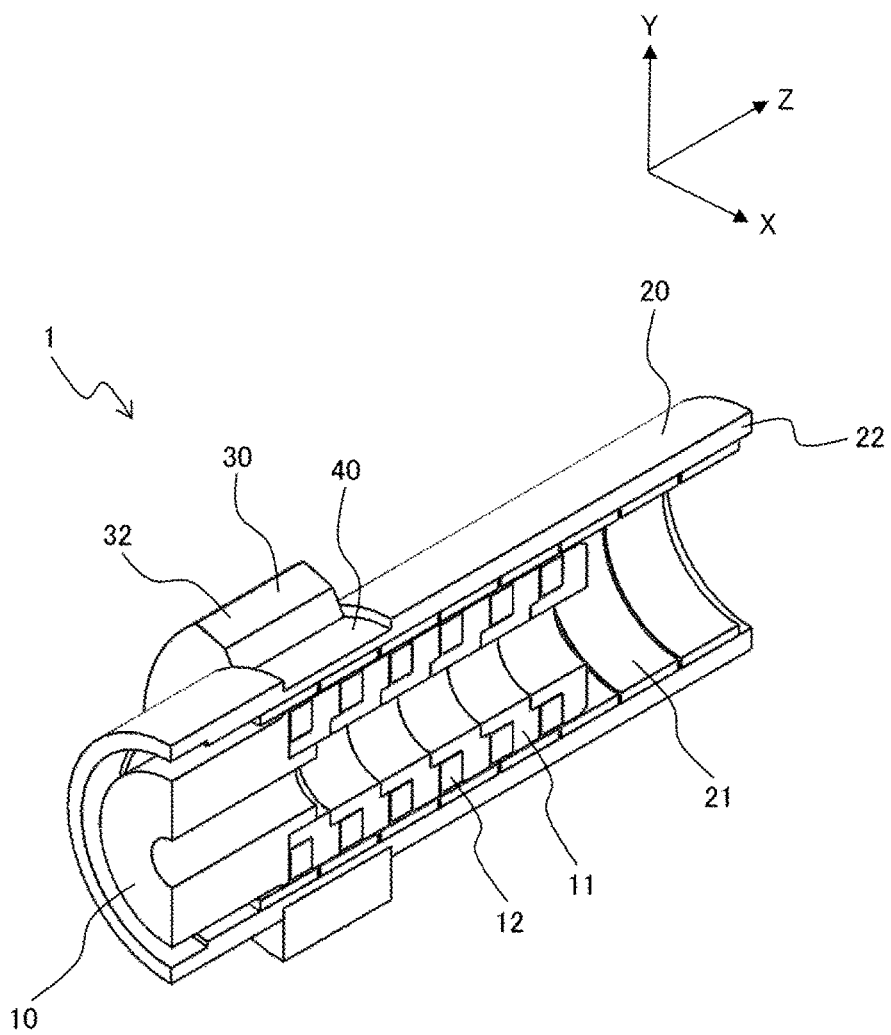
FIG. 9 is an explanatory diagram for explaining the linear motor 1 according to the second embodiment taken along a YZ plane.

FIG. 8 is an explanatory diagram for explaining the linear motor 1 according to the second embodiment in a perspective manner, and FIG. 9 is an explanatory diagram for explaining the linear motor 1 according to the second embodiment taken along a YZ plane.

The linear motor 1 according to the second embodiment is different from the linear motor 1 according to the first embodiment particularly in the recess 40 and the protrusion 30, and is substantially similar to the linear motor 1 according to the first embodiment in other basic configurations (the magnetic body 11 in the second embodiment is longer toward the spring lower connection rod 60 than that in the first embodiment).

In linear motor 1, the cylindrical magnetic body 22 has a circumferential (with a range of 360 degrees) groove having the same width and the same depth. In the linear motor 1, the protrusion 30 is disposed in part of the circumferential groove, and the recess 40 is formed in the other part of the circumferential groove where the protrusion 30 is not disposed.

That is, the recess 40 and the protrusion 30 are disposed on the outer periphery of the linear motor 1 and on the same circumference of the surface (surface of permanent magnet portion 20, surface of magnetic body 22) of the linear motor 1 in the region where the spring 50 is not disposed.

Note that the protrusion 30 is preferably configured separately from the magnetic body 22. The protrusion 30 may be configured integrally with the magnetic body 22. Recess 40 is formed integrally with magnetic body 22.

Then, by forming a circumferential groove in the magnetic body 22 to form the recess 40, the manufacturability of the magnetic body 22 (permanent magnet portion 20, linear motor 1) is improved.

Further, the protrusion 30 has a chamfered portion 32 obtained by chamfering a corner portion of the protrusion 30 particularly in order to suppress interference of the protrusion 30 at the time of movement of an object in the X direction and to suppress interference with other components and devices.

As a method of chamfering the chamfered portion 32, round chamfering, C chamfering, or the like can be considered. The chamfered portion 32 may have a polygonal cross section or a curved cross section.

Forming the chamfered portion 32 improves ease of installation of the linear motor 1 included in the electromagnetic suspension 2.

Furthermore, in a case where the posture of the vehicle 80 greatly changes, such as a case where the vehicle 80 goes over a large step, the degree of interference with other components and devices also increases.

In such a case, the positions of the components and devices disposed on the spring lower side and the components and devices disposed on the vehicle side change relative to the electromagnetic suspension 2.

That is, the positions of components and devices that interfere with the electromagnetic suspension 2 change relative to the electromagnetic suspension 2.

That is, in particular, in a case where the electromagnetic suspension 2 (linear motor 1) is disposed in a narrow space in which other components and devices are disposed, the linear motor 1 may interfere with other components and devices for an unpredictable and irregular behavior of the vehicle 80.

Therefore, it is preferable to dispose the protrusion 30 so as to be relatively rotatable with respect to the magnetic body 22 on the XY plane. That is, it is preferable that protrusion 30 rotationally move relative to magnetic body 22.

As a result, the degree of interference with other components and devices is reduced, and interference with other components and devices that may occur continuously is suppressed.

That is, the protrusion 30 is rotatably disposed with respect to the magnetic body 22, whereby the position of the recess 40 changes. By changing the position of the recess 40, it is possible to reduce the degree of interference with other components and devices for the behavior of the vehicle 80, suppress interference with other components and devices that may occur continuously, and further suppress damage to other components and devices (prevent deformation of other components and devices). Accordingly, the reliability of the electromagnetic suspension 2 is further improved.

Third Embodiment

Next, the linear motor 1 according to the third embodiment will be described in a perspective manner, and the XY cross section of the linear motor 1 according to the third embodiment will be described.

Figure 10:
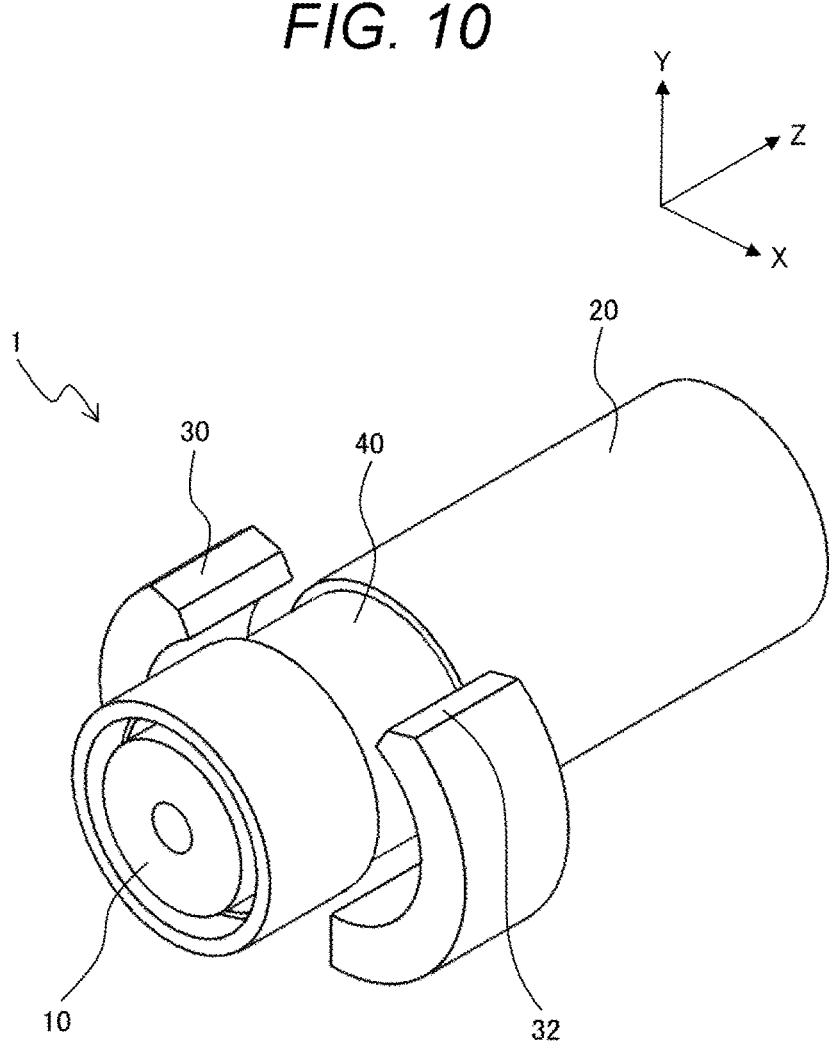
FIG. 10 is an explanatory diagram for explaining a linear motor 1 according to the third embodiment in a perspective manner.
Figure 11:
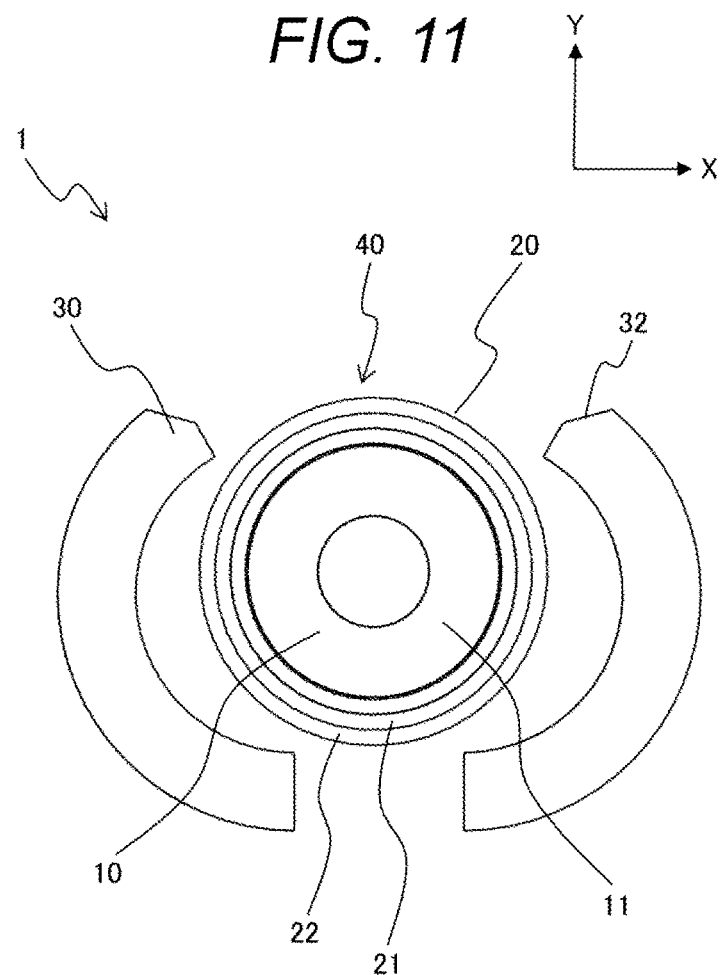
FIG. 11 is an explanatory diagram for explaining an XY cross section of the linear motor 1 according to the third embodiment.

FIG. 10 is an explanatory diagram for explaining a linear motor 1 according to the third embodiment in a perspective manner, and FIG. 11 is an explanatory diagram for explaining an XY cross section of the linear motor 1 according to the third embodiment.

The linear motor 1 according to the third embodiment is different from the linear motor 1 according to the second embodiment in the recess 40 and the protrusion 30, and is similar to the linear motor 1 according to the second embodiment in other basic configurations.

The linear motor 1 includes the cylindrical magnetic body 22 with a circumferential groove. In the linear motor 1, the protrusion 30 divided into two is disposed in part of the circumferential groove, and the recess 40 is formed in the other part of the circumferential groove where the protrusion 30 divided into two is not disposed.

In FIG. 10, for the sake of explanation, the protrusion 30 divided into two is illustrated separately from the permanent magnet portion 20.

By press-fitting and disposing the protrusions 30 divided into two into, for example, the circumferential groove, manufacturability of the protrusions 30 is improved. Furthermore, by using the protrusion 30 divided into two, the protrusion 30 can be disposed after the electromagnetic suspension 2 is mounted on the vehicle 80, and work efficiency is improved and performance of the electromagnetic suspension 2 can be adjusted.

In addition, the number of divisions of the protrusion 30 may be increased (the protrusion 30 may be divided into a plurality of portions), and the number of divisions of the protrusion 30 may be adjusted according to necessary characteristics. Furthermore, the number of divisions of the protrusion 30 may be adjusted to form the plurality of recesses 40.

In addition, it is preferable that the protrusion 30 is rotatably disposed on the XY plane with respect to the magnetic body 22. As a result, the degree of interference with other components and devices is reduced, and interference with other components and devices that may occur continuously is suppressed.

Next, a configuration example of the protrusion 30 according to the third embodiment will be described.

Figure 12:
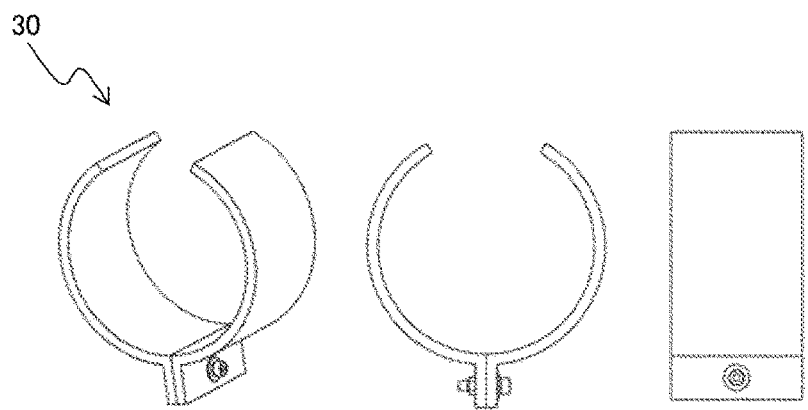
FIG. 12 is an explanatory diagram for explaining the configuration example 1 of a protrusion 30 according to the third embodiment.
Figure 13:
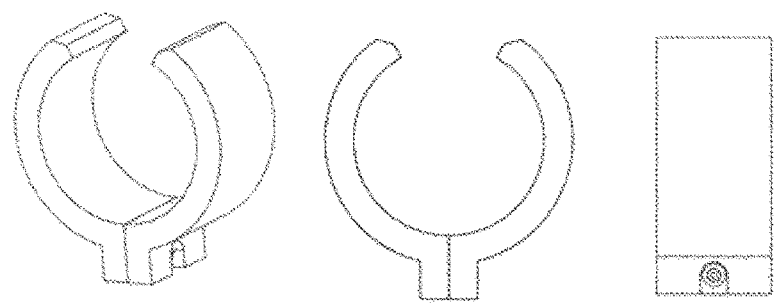
FIG. 13 is an explanatory diagram for explaining the configuration example 2 of a protrusion 30 according to the third embodiment.
Figure 14:
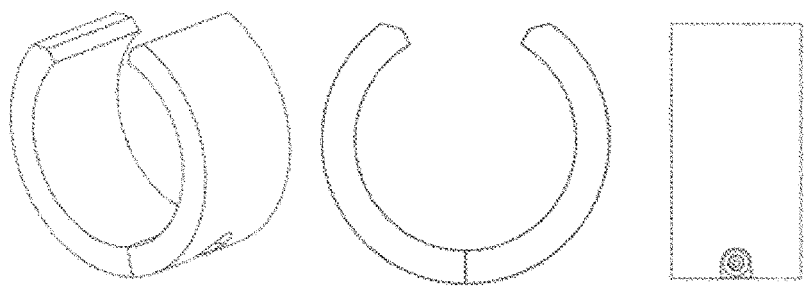
FIG. 14 is an explanatory diagram for explaining the configuration example 3 of a protrusion 30 according to the third embodiment.

FIGS. 12, 13, and 14 are explanatory diagrams for explaining the configuration example 1, the configuration example 2, and the configuration example 3 of the protrusion 30 according to the third embodiment.

By disposing the protrusion 30 after the electromagnetic suspension 2 is mounted on the vehicle 80, work efficiency is improved and performance of the electromagnetic suspension 2 can be adjusted.

The configuration example 1 illustrated in FIG. 12 is a configuration example in which the protrusion 30 is divided into two, the same flange portion is disposed on the same one side of each portion, a hole is formed in the flange portion, and the protrusions 30 divided into two are screwed. As a result, the protrusion 30 can be manufactured at low cost and can be easily attached.

The configuration example 2 illustrated in FIG. 13 is a configuration example in which the protrusion 30 is divided into two parts, the thickness of each part is increased, and the chamfered portion 32 in which the corner portion of the protrusion 30 is chamfered is formed in order to suppress interference with other components and devices. In the configuration example, the same flange portion is disposed on the same one side of each part, a hole is formed in the flange portion, a counterbore is formed in the flange portion, and the protrusions 30 divided into two are screwed. As a result, the installation property of the linear motor 1 included in the electromagnetic suspension 2 is improved, and damage to, for example, the brake hose due to the screw can be suppressed by the counterbore.

The configuration example 3 illustrated in FIG. 14 is a configuration example in which the protrusion 30 is divided into two parts, the thickness of each part is increased, and the chamfered portion 32 in which the corner portion of the protrusion 30 is chamfered is formed in order to suppress interference with other components and devices. In this configuration example, a hole is directly formed in protrusion 30 having a large wall thickness without forming a flange portion, and the protrusions 30 divided into two are screwed. As a result, the installation property of the linear motor 1 included in the electromagnetic suspension 2 is improved, and damage to, for example, the brake hose or the like due to the flange portion can be suppressed.

Fourth Embodiment

Next, a configuration example of the protrusion 30 according to the fourth embodiment will be described.

Figure 15:
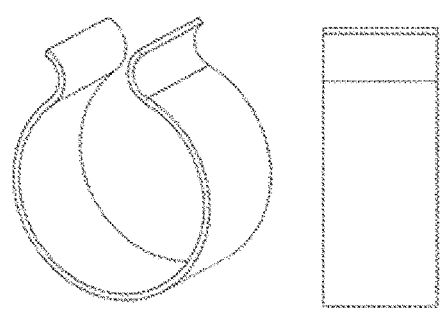
FIG. 15 is an explanatory diagram for explaining the configuration example of a protrusion 30 according to the fourth embodiment.

FIG. 15 is an explanatory diagram for explaining a configuration example of the protrusion 30 according to the fourth embodiment.

The linear motor 1 according to the fourth embodiment is different from the linear motor 1 according to the second embodiment in the protrusion 30, and is similar to the linear motor 1 according to the second embodiment in other basic configurations.

The configuration example illustrated in FIG. 15 is a configuration example in which the protrusion 30 is a member made of an elastic magnetic body. The protrusion 30 is integrally formed, and has a portion curvilinearly spreading outward in a portion where the recess 40 is formed. As a result, the protrusion 30 can be easily disposed by inserting the protrusion 30 into the circumferential groove formed in the magnetic body 22 from the bottom to the top in FIG. 15.

Fifth Embodiment

Next, the linear motor 1 according to the fifth embodiment will be described taken along a YZ plane.

Figure 16:
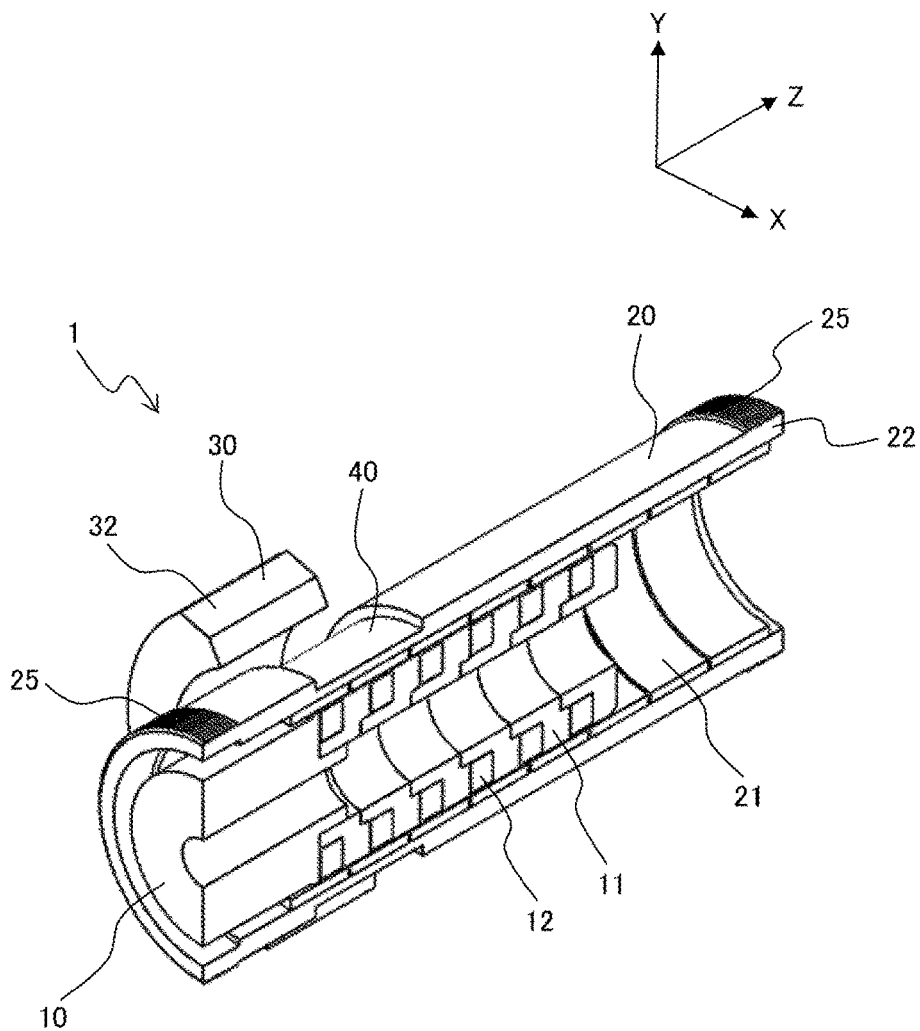
FIG. 16 is an explanatory diagram for explaining a linear motor 1 according to the fifth embodiment taken along a YZ plane.

FIG. 16 is an explanatory diagram for explaining the linear motor 1 according to the fifth embodiment taken along a YZ plane.

The linear motor 1 according to the fifth embodiment is different from the linear motor 1 according to the third embodiment in both ends of the permanent magnet portion 20, and is similar to the linear motor 1 according to the third embodiment in other basic configurations.

In the linear motor 1, a screw portion 25 are formed at each of both ends of the permanent magnet portion 20. As a result, the permanent magnet portion 20 (the linear motor 1 (the electromagnetic suspension 2)) can be fixed to the spring lower side or the vehicle side using the screw portion 25 formed in the permanent magnet portion 20.

At this time, it is necessary to rotate the permanent magnet portion 20 about the Z axis. Here, in a case where there is a possibility that components and devices disposed on the spring lower side or components and devices disposed on the vehicle side interferes with the permanent magnet portion 20, the permanent magnet portion 20 cannot be rotated about the Z axis.

Therefore, a circumferential groove is formed in the magnetic body 22 in the range of 360 degrees on the same circumference. As a result, it is possible to avoid, in the range of 360 degrees, components and devices disposed on the spring lower side and components and devices disposed on the vehicle side that may interfere with the permanent magnet portion 20.

The permanent magnet portion 20 can be rotated about the Z axis, and the permanent magnet portion 20 can be fixed to the spring lower side or the vehicle side using a screw portion 25 formed in the permanent magnet portion 20.

Further, the protrusion 30 is disposed in part of the circumferential groove, and the recess 40 is formed in the other part of the circumferential groove where the protrusion 30 is not disposed. The protrusion 30 can be disposed after the electromagnetic suspension 2 is mounted on the vehicle 80, so that work efficiency is improved and performance of the electromagnetic suspension 2 can be adjusted.

As a result, the permanent magnet portion 20 can be firmly fixed to the spring lower side or the vehicle side, and the reliability of the linear motor 1 (electromagnetic suspension 2) is improved.

The present invention is not limited to the embodiments described above, but includes various modifications. The above-described embodiments have been described in detail for easy understanding of the present invention, and the present invention is not necessarily limited to embodiments having all the configurations described.

Moreover, it is possible to replace part of the configuration of an embodiment with part of the configuration of another embodiment, and it is also possible to add the configuration of another embodiment to the configuration of an embodiment.

REFERENCE SIGNS LIST 1 linear motor
2 electromagnetic suspension
10 armature
11 magnetic body
12 winding
20 permanent magnet portion
21 permanent magnet
22 magnetic body
25 screw portion
30 protrusion
31 protrusion cross section
32 chamfered portion
40 recess
41 cylindrical end cover
42 recess cross section
50 spring 51 lower spring holding member
52 upper spring holding member
60 spring lower connection rod
61 vehicle connection rod
80 vehicle
90 spring lower member
91 vehicle member

The invention claimed is:

1. An electromagnetic suspension comprising:
a linear motor that includes an armature and a permanent magnet portion, the armature including a winding and a magnetic body, the permanent magnet portion being disposed on an outer periphery of the armature and including a permanent magnet and a cylindrical magnetic body, and the armature and the permanent magnet portion being relatively linearly driven in the linear motor, wherein
a recess recessed from an outer peripheral portion of the cylindrical magnetic body and a protrusion protruding from the outer peripheral portion are disposed on the same circumference of the outer peripheral portion of the cylindrical magnetic body.

2. The electromagnetic suspension according to claim 1, wherein
the protrusion is divided into a plurality of portions.

3. The electromagnetic suspension according to claim 1, wherein
a cross-sectional area of the protrusion is equal to or larger than a cross-sectional area of the recess.

4. The electromagnetic suspension according to claim 1, wherein
the protrusion is configured separately from the cylindrical magnetic body.

5. The electromagnetic suspension according to claim 1, wherein
the protrusion includes a chamfered portion obtained by chamfering a corner portion of the protrusion.

6. The electromagnetic suspension according to claim 1, wherein
a material of the protrusion has a higher magnetic permeability than a material of the cylindrical magnetic body.

7. The electromagnetic suspension according to claim 1, wherein
a cylindrical end cover is disposed at one end of the linear motor, a spring lower connection rod is coupled to the cylindrical end cover, and a vehicle connection rod is disposed at an other end of the linear motor.

8. The electromagnetic suspension according to claim 7, wherein
a lower spring holding member is disposed on an outer periphery of the linear motor and in a middle of the linear motor, an upper spring holding member is disposed at the vehicle connection rod, and a spring is disposed on the outer periphery of the linear motor so as to be sandwiched between the upper spring holding member and the lower spring holding member.

9. The electromagnetic suspension according to claim 1, wherein
the protrusion rotates relative to the cylindrical magnetic body.

* * * * *